US007708146B2

(12) United States Patent
Kruyer

(10) Patent No.: US 7,708,146 B2
(45) Date of Patent: May 4, 2010

(54) HYDROCYCLONE AND ASSOCIATED METHODS

(76) Inventor: Jan Kruyer, Box 138, Thorsby, Alberta (CA) T0C 2PO ( * ) Notice: Subject to any disclaimer, the term of this patent is extended or adjusted under 35 U.S.C. 154(b) by 155 days.

(21) Appl. No.: 11/940,099

(22) Filed: Nov. 14, 2007

(65) Prior Publication Data

US 2009/0120850 A1 May 14, 2009

(51) Int. Cl.
*B03B 5/28* (2006.01)
*B01D 21/26* (2006.01)

(52) U.S. Cl. ....................... 209/725; 209/164; 209/731; 210/512.1; 210/788

(58) Field of Classification Search .............. 209/139.2, 209/142, 720–723, 727, 730, 732, 734
See application file for complete search history.

(56) References Cited

U.S. PATENT DOCUMENTS

| | | | | |
|---|---|---|---|---|
| 2,910,424 | A | 10/1959 | Tek et al. | |
| 3,971,718 | A | 7/1976 | Reid | |
| 4,224,138 | A | 9/1980 | Kruyer | |
| 4,236,995 | A | 12/1980 | Kruyer | |
| 4,279,743 | A * | 7/1981 | Miller | 209/731 |
| 4,405,446 | A | 9/1983 | Kruyer | |
| 4,406,793 | A | 9/1983 | Kruyer | |
| 4,511,461 | A | 4/1985 | Kruyer | |
| 4,652,363 | A * | 3/1987 | Miller | 209/734 |
| 4,960,525 | A * | 10/1990 | Dalby et al. | 210/788 |
| 5,667,686 | A * | 9/1997 | Schubert | 210/512.1 |
| 6,019,825 | A * | 2/2000 | Greene et al. | 96/209 |
| 6,315,837 | B1 | 11/2001 | Barclay | |
| 6,378,608 | B1 | 4/2002 | Nilsen et al. | |
| 6,436,298 | B1 | 8/2002 | Parkinson | |
| 6,461,499 | B1 * | 10/2002 | Bosman | 210/112 |
| 6,482,246 | B1 | 11/2002 | Dyson et al. | |
| 6,579,454 | B2 * | 6/2003 | Kaske | 210/222 |
| 6,730,222 | B1 | 5/2004 | Andoh et al. | |

(Continued)

FOREIGN PATENT DOCUMENTS

CA 1085760 2/1914

(Continued)

OTHER PUBLICATIONS

U.S. Appl. No. 11/939,978, filed Nov. 14, 2007.

(Continued)

*Primary Examiner*—Patrick Mackey
*Assistant Examiner*—Terrell H Matthews
(74) *Attorney, Agent, or Firm*—Thorpe North & Western LLP

(57) ABSTRACT

A hydrocyclone can be used for separating components of a fluid. The hydrocyclone can include a substantially open cylindrical vessel and a helical confined path connected upstream of the cylindrical vessel. The open vessel can include an open vessel inlet configured to introduce a fluid tangentially into the open vessel. The helical confined path can be connected to the open vessel at the open vessel inlet. One or more wash inlets can be used to introduce a wash fluid into the helical confined path and/or the open vessel. An overflow outlet and underflow outlet can be operatively attached to the open vessel for removal of the separated fluid components. Although a number of fluids can be effectively treated, de-sanding of bitumen slurries from oil sands can be readily achieved.

25 Claims, 4 Drawing Sheets

U.S. PATENT DOCUMENTS

| | | | | |
|---|---|---|---|---|
| 6,743,359 | B1 | 6/2004 | Smyth et al. | |
| 6,767,459 | B1 | 7/2004 | Sinker et al. | |
| 6,849,182 | B2 | 2/2005 | Redding | |
| 7,097,255 | B2 | 8/2006 | Drake et al. | |
| 7,141,162 | B2 * | 11/2006 | Garner et al. | 210/202 |
| 7,147,788 | B2 | 12/2006 | Tveiten | |
| 7,169,305 | B2 | 1/2007 | Gomez | |
| 7,175,337 | B2 | 2/2007 | Bergman | |
| 7,179,379 | B2 | 2/2007 | Appel et al. | |
| 7,182,874 | B2 | 2/2007 | Allard et al. | |
| 7,192,092 | B2 | 3/2007 | Watson | |
| 7,438,189 | B2 * | 10/2008 | Garner et al. | 209/164 |
| 2003/0146523 | A1 * | 8/2003 | Morse et al. | 261/79.2 |
| 2005/0173335 | A1 * | 8/2005 | Rogers et al. | 210/512.1 |
| 2006/0000111 | A1 | 1/2006 | Cho et al. | |
| 2006/0249439 | A1 * | 11/2006 | Garner et al. | 210/202 |
| 2009/0120850 | A1 * | 5/2009 | Kruyer | 209/725 |

FOREIGN PATENT DOCUMENTS

| | | |
|---|---|---|
| CA | 1129363 | 2/1915 |
| CA | 1132473 | 3/1915 |
| CA | 1241297 | 9/1917 |
| CA | 1243984 | 10/1917 |
| CA | 1269064 | 6/1918 |
| CA | 1280075 | 9/1918 |
| CA | 1288058 | 12/1918 |
| CA | 1331359 | 2/1920 |
| CA | 1085760 | 9/1980 |
| CA | 1141318 | 2/1983 |
| CA | 1141319 | 2/1983 |
| CA | 1144498 | 4/1983 |
| CA | 1162899 | 2/1984 |
| CA | 1167792 | 5/1984 |
| CA | 1334584 | 6/1989 |
| CA | 2033217 | 12/1990 |
| JP | 56-078650 | 6/1981 |

OTHER PUBLICATIONS

U.S. Appl. No. 11/948,851, filed Nov. 30, 2007.
U.S. Appl. No. 11/348,816, filed Nov. 30, 2007.

* cited by examiner

FIG.3A
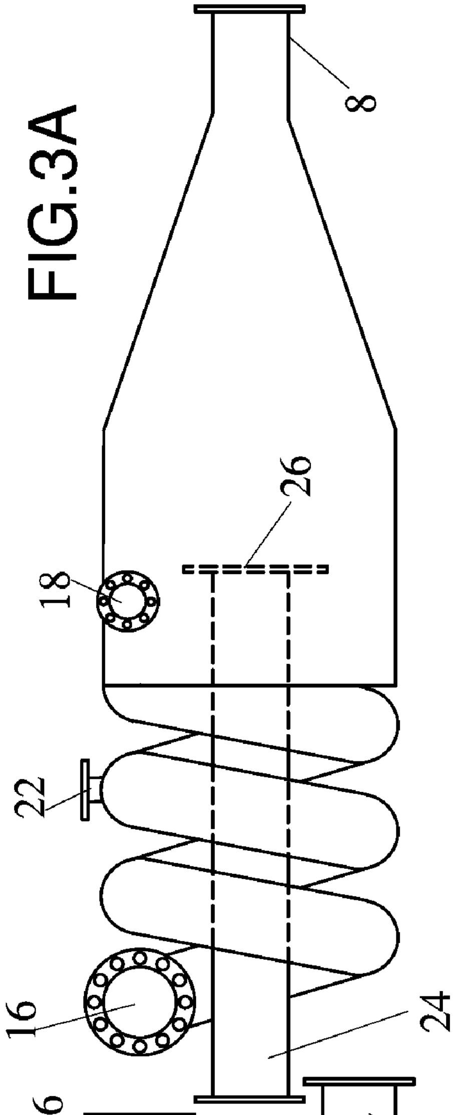
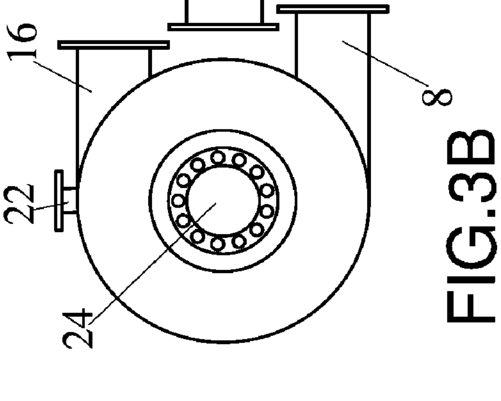
FIG.3B
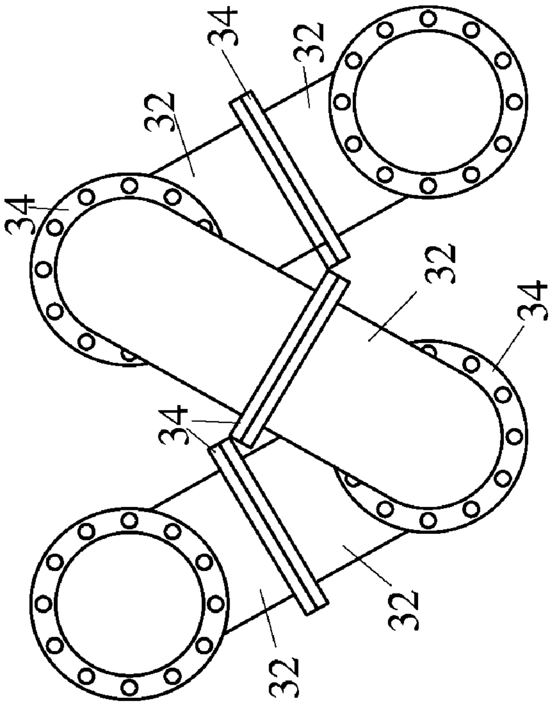
FIG. 4

HYDROCYCLONE AND ASSOCIATED METHODS

RELATED APPLICATIONS

This application is related to U.S. patent application Ser. No. 11/939,978, entitled "Sinusoidal Mixing and Shearing Apparatus and Associated Methods," filed concurrently herewith and which is incorporated herein by reference.

FIELD OF THE INVENTION

The present invention relates to devices and methods for hydraulically sorting of fluids after these have been processed by static mixing and/or shearing of fluids, or by other methods. Accordingly, the present invention involves the fields of process engineering, chemistry, and chemical engineering.

BACKGROUND OF THE INVENTION

According to some estimates, oil sands, also known as tar sands or bituminous sands, may represent up to two-thirds of the world's petroleum. Oil sands resources are relatively untapped. Perhaps the largest reason for this is the difficulty of extracting bitumen from the sands. Mineable oil sand is found as an ore in the Fort McMurray region of Alberta, Canada, and elsewhere. This oil sand includes sand grains having viscous bitumen trapped between the grains. The bitumen can be liberated from the sand grains by slurrying the as-mined oil sand in water so that the bitumen flecks move into the aqueous phase for separation. For the past 40 years, bitumen in McMurray oil sand has been commercially recovered using the original Clark Hot Water Extraction process, along with a number of improvements. Karl Clark invented the original process at the University of Alberta and at the Alberta Research Council around 1930 and improved it for over 30 years before it was commercialized.

In general terms, the conventional hot water process involves mining oil sands by bucket wheel excavators or by draglines at a remote mine site. The mined oil sands are then conveyed, via conveyor belts, to a centrally located bitumen extraction plant. In some cases, the conveyance can be as long as several kilometers. Once at the bitumen extraction plant, the conveyed oil sands are conditioned. The conditioning process includes placing the oil sands in a conditioning tumbler along with steam, water, and caustic soda in an effort to disengage bitumen from the sand grains of the mined oil sands. Further, conditioning is intended to remove oversize material for later disposal. Conditioning forms a hot, aerated slurry for subsequent separation. The slurry can be diluted for additional processing, using hot water. The diluted slurry is then pumped into a primary separation vessel (PSV). The diluted hot slurry is then separated by flotation in the PSV. Separation produces three components: an aerated bitumen froth which rises to the top of the PSV; primary tailings, including water, sand, silt, and some residual bitumen, which settles to the bottom of the PSV; and a middlings stream of water, suspended clay, and suspended bitumen. The bitumen froth can be skimmed off as the primary bitumen product. The middlings stream can be pumped from the middle of the PSV to sub-aeration flotation cells to recover additional aerated bitumen froth, known as a secondary bitumen product. The primary tailings from the PSV, along with secondary tailings product from flotation cells are pumped to a tailings pond, usually adjacent to the extraction plant, for impounding. The tailings sand can be used to build dykes around the pond and to allow silt, clay, and residual bitumen to settle for a decade or more, thus forming non-compacting sludge layers at the bottom of the pond. Clarified water eventually rises to the top for reuse in the process.

The bitumen froth is treated to remove air. The deaerated bitumen froth is then diluted with naptha and centrifuged to produce a bitumen product suitable for upgrading. Centrifuging also creates centrifugal tailings that contain solids, water, residual bitumen, and naptha, which can be disposed of in the tailings ponds.

More than 40 years of research and many millions of dollars have been devoted to developing and improving the Clark process by several commercial oil sands operators, and by the Alberta government. Research has largely been focused on improving the process and overcoming some of the major pitfalls associated with the Clark process. Some of the major pitfalls are:

1. Major bitumen losses from the conditioning tumbler, from the PSV and from the subaeration cells.
2. Reaction of hot caustic soda with mined oil sands result in the formation of naphthenic acid detergents, which are extremely toxic to marine and animal life, and require strict and costly isolation of the tailings ponds from the environment for at least many decades.
3. Huge energy losses due to the need to heat massive amounts of mined oil sands and massive amounts of water to achieve the required separation, which energy is then discarded to the ponds.
4. Loss of massive amounts of water taken from water sources, such as the Athabasca river, for the extraction process and permanently impounded into the tailings ponds that can not be returned to the water sources on account of its toxicity. For example, to produce one barrel of oil requires over 2 barrels of water from the Athabasca River.
5. The cost of constructing and maintaining a large separation plant.
6. The cost of transporting mined oil sands from a remote mining location to a large central extraction plant by means of conveyors. Additionally, the conveyors can be problematic.
7. The cost of dilution centrifuging.
8. The cost of naphtha recovery.
9. The cost of maintaining and isolating huge tailings ponds.
10. The cost of preventing leakage of toxic liquids from the tailings ponds.
11. The cost of government fines when environmental laws are breached.
12. The eventual cost of remediation of mined out oil sands leases and returning these to the environment in a manner acceptable to both the Alberta and the Canadian government.
13. The environmental impact of the tailings ponds.

Some major improvements have been made that included lowering the separation temperature in the tumbler, the PSV, and the flotation cells. This reduced the energy costs to a degree but also required the use of larger tumblers and the addition of more air to enhance bitumen flotation. Another improvement eliminated the use of bucket wheel excavators, draglines and conveyor belts to replace these with large shovels and huge earth moving trucks, and then later to replace some of these trucks with a slurry pipeline to reduce the cost of transporting the ore from the mine site to the separation plant. Slurry pipelines eliminate the need for conditioning tumblers but require the use of oil sand crushers to prevent pipe blockage and require cyclo-feeders to aerate the oil sand slurry as it enters the slurry pipeline, and may also require costly compressed air injection into the pipeline. Other improvements included tailings oil recovery units to scavenge additional bitumen from the tailings, and naptha recovery units for processing the centrifugal tailings before these enter the tailings ponds.

More recent research is concentrating on reducing the separation temperature of the Clark process even further and on adding gypsum or flocculants to the sludge of the tailings ponds to compact the fines and release additional water. However, adding gypsum hardens the water and this can require softening of the water before it can be recycled to the extraction plant. Most of these improvements have served to increase the amount of bitumen recovered and reduce the amount of energy required, but have increased the complexity and size of the commercial oil sands plants.

One particular problem that has vexed commercial mined oil sands plants is the problem of fine tailings disposal. In the current commercial process, mined oil sands are mixed and stirred with hot water, air, and caustic soda to form a slurry that is subsequently diluted with cooler water and separated in large separation vessels. In these vessels, air bubbles attach to bitumen droplets of the diluted slurry and cause bitumen product to float to the top for removal as froth. Caustic soda serves to disperse the fines to reduce the viscosity of the diluted slurry and allows the aerated bitumen droplets to travel to the top of the separation vessels fast enough to achieve satisfactory bitumen recovery in a reasonable amount of time. Caustic soda serves to increase the pH of the slurry and thereby imparts electric charges to the fines, especially to the clay particles, to repel and disperse these particles and thereby reduce the viscosity of the diluted slurry. For most oil sands without caustic soda, the diluted slurry would be too viscous for effective bitumen recovery. It can be shown from theory or in the laboratory that for an average oil sand, it takes five to ten times as long to recover the same amount of bitumen if no caustic soda is added to the slurry. Such a long residence time would make commercial oil sands extraction much more expensive and impractical.

While caustic soda is beneficial as a viscosity breaker in the separation vessels for floating off bitumen, it is environmentally very detrimental. At the high water temperatures used during slurry production it reacts with naphthenic acids in the oil sands to produce detergents that are highly toxic. Not only are the tailings toxic, but also the tailings fines will not generally settle. Tailings ponds with a circumference as large as 20 kilometers are required at each large mined oil sands plant to contain the fine tailings. Coarse sand tailings are used to build huge and complex dyke structures around these ponds.

Due to the prior addition of caustic soda, the surfaces of the fine tailings particles are electrically charged, which in the ponds, causes the formation of very thick layers of microscopic card house structures that compact extremely slowly and take decades or centuries to dewater. Many millions of dollars per year have been and are being spent in an effort to maintain the tailings ponds and to find effective ways to dewater these tailings. Improved mined oil sands processes must be commercialized to overcome the environmental problems of the current plants. One such alternate method of oil sands extraction is the Kruyer Oleophilic Sieve process invented in 1975.

Like the Clark Hot Water process, the Kruyer Oleophilic Sieve process originated at the Alberta Research Council and a number of Canadian and U.S. patents were granted to Kruyer as he privately developed the process for over 30 years. The first Canadian patent of the Kruyer process was assigned to the Alberta Research Council and, and all subsequent patents remain the property of Kruyer. Unlike the Clark process, which relies on flotation of bitumen froth, the Kruyer process uses a revolving apertured oleophilic wall (trade marked as the Oleophilic Sieve) and passes the oil sand slurry to the wall to allow hydrophilic solids and water to pass through the wall apertures whilst capturing bitumen and associated oleophilic solids by adherence to the surfaces of the revolving oleophilic wall.

Along the revolving apertured oleophilic wall, there are one or more separation zones to remove hydrophilic solids and water and one or more recovery zones where the recovered bitumen and oleophilic solids are removed from the wall. This product is not an aerated froth but a viscous liquid bitumen.

A bitumen-agglomerating step normally is required to increase the bitumen particle size before the slurry passes to the apertured oleophilic wall for separation. Attention is drawn to the fact that in the Hot Water Extraction process the term "conditioning" is used to describe a process wherein oil sands are gently mixed with controlled amounts water in such a manner as to entrain air in the slurry to eventually create a bitumen froth product from the separation. The Oleophilic Sieve process also produces a slurry when processing mined oil sands but does not "condition" it. Air is not required, nor desired, in the Oleophilic Sieve process. As a result, the slurry produced for the Oleophilic Sieve, as well as the separation products, are different from those associated with the conventional Hot Water Extraction process. The Kruyer process was tested extensively and successfully implemented in a pilot plant with high grade mined oil sands (12 wt % bitumen), medium grade mined oil sands (10 wt % bitumen), low grade oil sands (6 wt % bitumen) and with sludge from commercial oil sands tailings ponds (down to 2% wt % bitumen), the latter at separation temperatures as low as 5° C. A large number of patents are on file for the Kruyer process in the Canadian and U.S. Patent Offices. These patents include: CA 2,033,742; CA 2,033,217; CA 1,334,584; CA 1,331,359; CA 1,144,498 and related U.S. Pat. No. 4,405,446; CA 1,141,319; CA 1,141,318; CA 1,132,473 and related U.S. Pat. No. 4,224,138; CA 1,288,058; CA 1,280,075; CA 1,269,064; CA 1,243,984 and related U.S. Pat. No. 4,511,461; CA 1,241,297; CA 1,167,792 and related U.S. Pat. No. 4,406,793; CA 1,162,899; CA 1,129,363 and related U.S. Pat. No. 4,236,995; and CA 1,085,760.

While in a pilot plant, the Kruyer process has yielded higher bitumen recoveries, used lower separation temperatures, was more energy efficient, required less water, did not produce toxic tailings, used smaller equipment, and was more movable than the Clark process. There were a number of drawbacks, though, to the Kruyer process.

One drawback to the Kruyer process is related to the art of scaling up. Scaling up a process from the pilot plant stage to a full size commercial plant normally uncovers certain engineering deficiencies of scale such as those identified below.

Commercial size apertured drums that may be used as revolving apertured oleophilic walls require very thick perforated steel walls to maintain structural integrity. Such thick walls increase retention of solids by the bitumen and may degrade the resulting bitumen product. Alternately, apertured mesh belts may be used as revolving apertured oleophilic walls. These have worked well in the pilot plant but after much use, have tended to unravel and fall apart. This problem will likely be exacerbated in a commercial plant running day and night. Rugged industrial conveyor belts are available. These are made from pre-punched serpentine strips of flat metal and then joined into a multitude of hinges by cross rods to form a rugged industrial conveyor belt. Other industrial metal conveyor belts are made from flattened coils of wire and then joined into a multitude of hinges by cross rods to form the belts. Both types of metal belts were tested and have stood up well in a pilot plant. However, it was difficult and energy intensive to remove most of the bitumen product in the recovery zone from the surfaces of the belts before these revolved back to the separation zone.

Bitumen agglomerating drums using oleophilic free bodies, in the form of heavy oleophilic balls that tumbled inside these drums worked very well in the pilot plant. However commercial size agglomerators using tumbling free bodies may require much energy and massive drum structures to contain a revolving bed of freely moving heavy oleophilic balls with adhering viscous cold bitumen to achieve the desired agglomeration of dispersed bitumen particles.

As such, improvements to methods and related equipment for recovery of bitumen from oil sands continue to be sought through ongoing research and development efforts.

SUMMARY OF THE INVENTION

Accordingly, the present invention relates to the separation of mined oil sands or bitumen containing mixtures by an endless oleophilic belt formed by wrapping an oleophilic endless wire rope a plurality of times around two or more drums or rollers to form a multitude of sequential oleophilic wraps wherein hydrophilic materials including water and hydrophilic solids pass through the spaces or voids between said sequential wraps in a separation zone and oleophilic materials including bitumen and oleophilic solids are captured by the oleophilic wraps for subsequent removal in a recovery zone. Before mined oil sands can be separated, bitumen can be disengaged from the sand grains by a mixing and/or shearing action in the presence of a continuous water phase.

This present invention relates particularly to a hydrocyclone and a related method for separating components from a fluid or from an oil sand slurry after it has been processed in a pipe or pipeline sufficient to disengage at least a portion of bitumen from sand particles of the slurry. In one aspect, the hydrocyclone can be used to de-sand a slurry including bitumen and solid particulate such as gravel, sand, silt and clay. The hydrocyclone includes a helical confined path connected to and upstream of a substantially open cylindrical vessel. The connection from the helical confined path to the open vessel, or open vessel inlet, can be configured to, without disturbance, introduce a fluid tangentially from the helical confined path into the open vessel. The hydrocyclone can further include an overflow outlet and an underflow outlet, both operatively attached to the open vessel. The underflow outlet can be attached at a location on the open vessel that is substantially opposite the helical confined path and open vessel inlet. The overflow outlet can be configured to terminate at one end at a vortex finder that is positioned in an interior of the open cylindrical vessel and has a substantially enclosed conduit from the vortex finder to an exterior of the open cylindrical vessel.

Likewise, a method for separating components from a fluid can include guiding the fluid along a helical path at high velocity to form a helically flowing fluid. The method can further include tangentially injecting the helically flowing fluid smoothly at high velocity into an open vessel to cause the fluid to rotate along a swirl path within the open vessel. The rotation along the swirl path of the fluid can be sufficient to produce an overflow and an underflow. A rinse fluid can be injected tangentially into at least one of the helical path and the swirl path. The underflow and the overflow can be removed from the open vessel. The rinse fluid generally includes or consists essentially of water, although other fluids or additives can be used.

Such hydrocyclone and methods can be used for a variety of applications, and specifically for de-sanding aqueous fluids containing bitumen. In a further embodiment, the fluid can include gravel, sand, fines, bitumen and water, and can produce an overflow primarily of bitumen, fines and water, while the underflow includes gravel and coarse sand.

There has thus been outlined, rather broadly, various features of the invention so that the detailed description thereof that follows may be better understood, and so that the present contribution to the art may be better appreciated. Other features of the present invention will become clearer from the following detailed description of the invention, taken with the accompanying claims, or may be learned by the practice of the invention.

BRIEF DESCRIPTION OF THE DRAWINGS

FIG. 3A is a side view of a hydrocyclone in accordance with yet another embodiment of the present invention having a conical outlet end.

FIG. 3B is an end view of the hydrocyclone of FIG. 3A.

FIG. 4 is a side view of a portion of a helical confined path comprising multiple coupled pipe elbows, in accordance with one embodiment of the present invention.

Figure 1A:
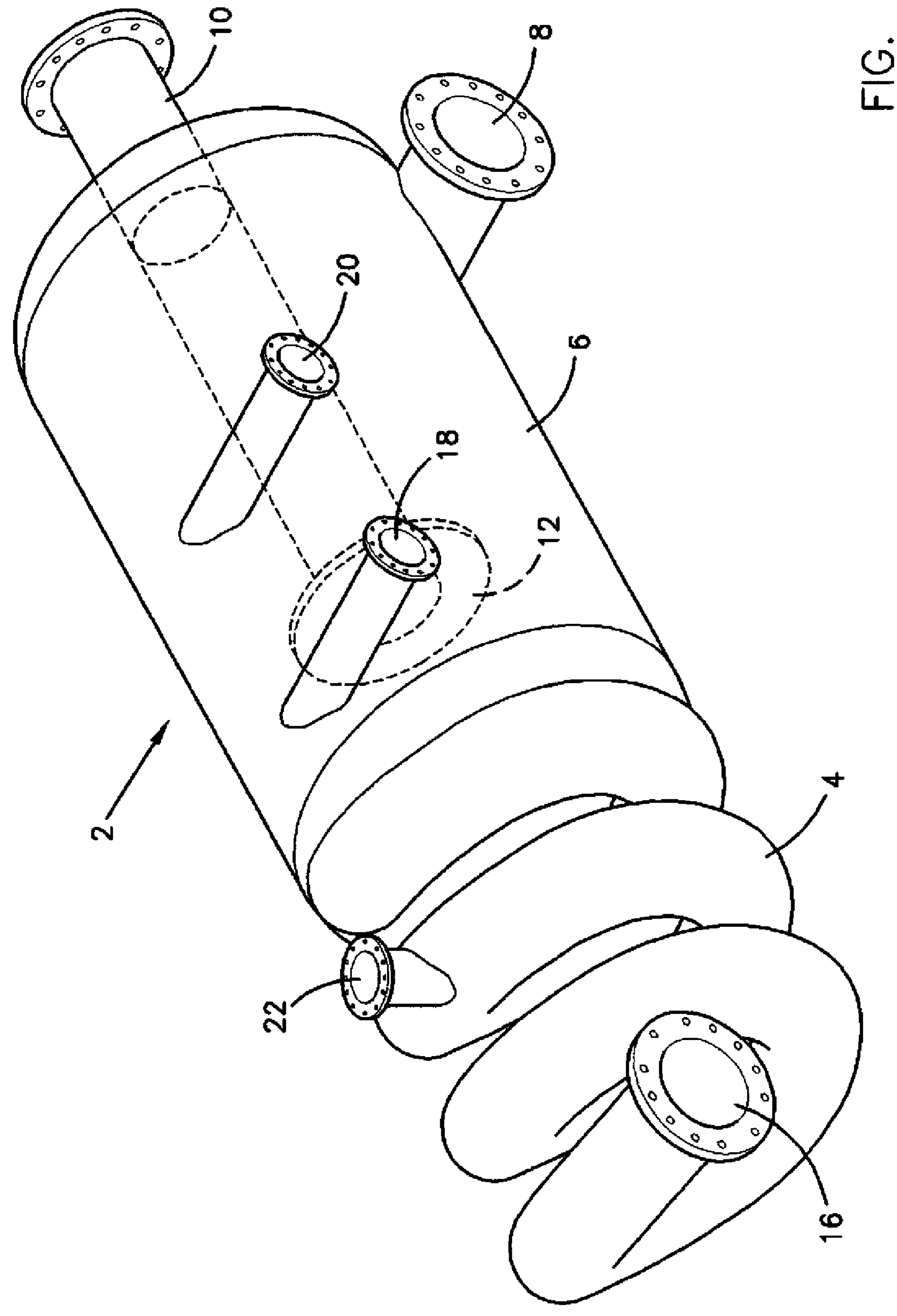
FIG. 1A is an elevated perspective view of a hydrocyclone according to one embodiment of the present invention.

It will be understood that the above figures are simplified and are merely for illustrative purposes in furthering an understanding of the invention without in any way limiting any applications or aspects of the invention. Further, the figures are not drawn to scale, thus dimensions and other aspects may, and generally are, exaggerated or changed to make illustrations thereof clearer. Therefore, departure can be made from the specific dimensions and aspects shown in the figures in order to produce the hydrocyclone of the present invention.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It must be noted that, as used in this specification and the appended claims, the singular forms "a," "an," and "the" include plural referents unless the context clearly dictates otherwise. Thus, for example, reference to "a pump" includes one or more of such pumps, reference to "an elbow" includes reference to one or more of such elbows, and reference to "injecting" includes reference to one or more of such actions.

DEFINITIONS

In describing and claiming the present invention, the following terminology will be used in accordance with the definitions set forth below.

As used herein, "agglomeration drum" refers to a revolving drum containing oleophilic surfaces that is used to increase the particle size of bitumen in oil sand slurries prior to separation. Bitumen particles flowing through the drum come in contact with the oleophilic surfaces and adhere thereto to form a layer of bitumen of increasing thickness until the layer becomes so large that shear from the flowing slurry and from the revolution of the drum causes a portion of the bitumen layer to slough off, resulting in bitumen particles that are much larger than the original bitumen particles of the slurry.

As used herein, "bitumen" refers to a viscous hydrocarbon, including maltenes and asphaltenes, that is found in oil sands ore interstitially between the sand grains. In a typical oil sands plant, there are many different streams that may contain bitumen.

As used herein, "central location" refers to a location that is not at the periphery, introductory, or exit areas. In the case of a pipe, a central location is a location that is neither at the beginning of the pipe nor the end point of the pipe and is sufficiently remote from either end to achieve a desired effect, e.g. washing, disruption of agglomerated materials, etc.

As used herein, "conditioning" in reference to mined oil sand is consistent with conventional usage and refers to mixing a mined oil sand with water, air and caustic soda to produce a warm or hot slurry of oversize material, coarse sand, silt, clay and aerated bitumen suitable for recovering bitumen froth from said slurry by means of froth flotation. Such mixing can be done in a conditioning drum or tumbler or, alternatively the mixing can be done as it enters into a slurry pipeline and/or while in transport in the slurry pipeline. Conditioning aerates the bitumen for subsequent recovery in separation vessels, e.g. by flotation. Likewise, referring to a composition as "conditioned" indicates that the composition has been subjected to conditioning.

As used herein, the term "confined" refers to a state of substantial enclosure. A path of fluid may be confined if the path is, e.g., walled or blocked on a plurality of sides, such that there is an inlet and an outlet and direction of the flow which is directed by the shape and direction of the confining material. Although typically provided by a pipe, baffles or other features can also create a confined path.

As used herein, the term "cylindrical" indicates a generally elongated shape having a substantially circular cross-section. Therefore, cylindrical includes cylinders, conical shapes, and combinations thereof. The elongated shape has a length referred herein to as a depth calculated from one of two points—the open vessel inlet, or the defined top or side wall nearest the open vessel inlet.

As used herein, "disengagement" and "digesting" of bitumen are used interchangeably, and refer to a primarily physical separation of bitumen from sand or other particulates in mined oil sand slurry. Disengagement of bitumen from oil sands occurs when physical forces acting on the oil sand slurry results in the at least partial segregation of bitumen from sand particles in an aqueous medium. Such disengagement is intended to be an alternative approach to conventional conditioning, although disengagement could optionally be performed in conjunction with conditioning.

As used herein, the "isoelectric point" of a slurry or its clay fines component is the point at which the electric charges on the double layer surrounding clay particles are close to zero, e.g. substantially zero, or are zero. The isoelectric point can be determined by measuring the zeta potential of the clay fines in suspension and also is indicated to some degree by the viscosity of the slurry. Close to the isoelectric point the slurry generally has a higher viscosity than further away from the isoelectric point since electric charges generally disperse the clay fines and the absence of electric charges generally discourages dispersion of the clay fines. Dispersion of the fines commonly is achieved by increasing the pH of the slurry above the isoelectric point or decreasing the pH of the slurry below the isoelectric point.

As used herein, "endless cable belt" when used in reference to separations processing refers to an endless cable that is wrapped around two or more drums and/or rollers a multitude of times to form an endless belt having spaced cables. Movement of the endless cable belt can be facilitated by at least two guide rollers or guides that prevent the cable from rolling off an edge of the drum or roller and guide the cable back onto a drum or roller. The apertures in the endless belt are the slits or gaps between sequential wraps. The endless cable can be a wire rope, a plastic rope, a metal cable, a single wire, compound filament (e.g. sea-island) or a monofilament which is spliced together to form a continuous loop, e.g. by splicing. As a general guideline, the diameter of the endless cable can be as large as 2 cm and as small as 0.001 cm, although other sizes might be suitable for some applications. An oleophilic endless cable belt is an endless cable belt made from a material that is oleophilic under the conditions at which it operates.

As used herein, "fluid" refers to flowable matter. Fluids, as used in the present invention typically include a liquid or gas, and may optionally further include amounts of solids and/or gases dispersed therein. As such, fluid specifically includes slurries (liquid with solid particulate), aerated liquids, and combinations of the two fluids. In describing certain embodiments, the term slurry and fluid may be interchangeable, unless explicitly stated to the contrary.

As used herein, "helical" refers to a shape which conforms to a spiral or twisted configuration where multiple, generally circular, loops are oriented along a central axis substantially perpendicular to a plane of the loops. A helical shape is commonly seen in springs where consecutive loops are stretched along the central axis, although a compacted helical path, i.e. a flat spiral, and the like can also be suitable. Further, the cross-sectional shape can deviate from regular circular and/or can have a constant curvature. For example, a helical shape can have an elliptical cross-section, have a non-constant curvature so as to produce a conical helical shape, and/or can have one or more passes which are skewed or slanted from perpendicular to the central axis. Consistent with this definition, a "helical path" is a path which follows a helical shape and is generally "confined" to such a path by physical barriers such as pipe walls.

As used herein, the term "metallic" refers to both metals and metalloids. Metals include those compounds typically considered metals found within the transition metals, alkali and alkali earth metals. Non-limiting examples of metals are Ag, Au, Cu, Al, and Fe. In one aspect, suitable metals can be main group and transition metals. Metalloids include specifically Si, B, Ge, Sb, As, and Te, among others. Metallic materials also include alloys or mixtures that include metallic materials. Such alloys or mixtures may further include additional additives.

As used herein, "open cylindrical vessel" refers to a vessel which is substantially free of internal structures and/or obstructions other than those explicitly identified as present, e.g. a vortex finder. An open cylindrical vessel can often be a completely vacant cylindrical vessel having various inlets and outlets as identified with substantially no other structures present within the vessel other than an optional vortex finder.

As used herein, "overflow" refers to a more central portion of a swirl flow, and as such, is often the more valuable fluid containing fines and bitumen. "Underflow" likewise refers to a more circumferential portion of a swirl flow and typically contains coarser material and is often drawn off as effluent and/or for further processing. Often, a processed fluid is split into a single overflow and single underflow, although multiple overflow and/or underflows may be useful.

As used herein, "operatively associated with" refers to any functional association which allows the identified components to function consistent their intended purpose. For example, units such as pumps, pipes, vessels, tanks, etc. can be operatively associated by direct connection to one another or via an intermediate connection such as a pipe or other member. Typically, in the context of the present invention, the units or other members can be operatively associated by fluid communication amongst two or more units or devices.

As used herein, "periodically crosses" refers to a regular crossing or traversing of particles at periodic intervals (i.e. regular or irregular, but repeating) across the bulk flow of a flowing fluid.

As used herein, "repeating sinusoidal wave in a two-dimensional plane" refers to a shape that, when viewed from a projected side view, has the characteristics of a repeating harmonic wave, i.e. a sinusoidal wave. As such, the sinusoidal wave may in some cases be defined or described in terms associated with sine waves. A repeating sinusoidal wave, according to the present invention, has amplitude and periods. The sinusoidal wave can be deformed, can have delays in period, and can be dampened in all or some of the length of the wave. The pipe in the shape of the wave is not necessarily in a two-dimensional plane of motion. In a specific embodiment, the sinusoidal pipe is substantially two-dimensional and can be described as serpentine. Alternatively, the sinusoidal pipe can have three-dimensional aspects such that at least a portion of the path is out of plane. However, the sinusoidal wave of the present invention is distinct from helical or spiral shapes in that that repeating sinusoidal wave has a velocity directional vector that alternates, whereas spiral and helical shapes are subject to velocity directional vectors that are rotational-based and relatively constant about an axis of rotation. Specifically, repeating sinusoidal waves according to the present invention do not have identifiable axes of rotation parallel to the length of the pipe for longer than one period of repetition of the sine wave shape. At times, and for ease of discussion, the term "repeating sinusoidal wave in a two-dimensional plane" may be shortened to "sinusoidal wave."

As used herein, "swirl path" refers to a flow pattern which generally follows an unconfined helical path, although significant mixing and chaotic flow occurs along the axis of overall flow down the length of a vessel. A swirl path is generally produced by introducing fluids tangentially into a generally cylindrical vessel thus producing flow circumferentially as well as longitudinally down the vessel length. Although a helical path and swirl path have similar general shapes, a helical path is generally used herein in reference to a confined helical flow while a swirl path refers to an unconfined, generally helical, swirl flow.

As used herein, "velocity" is used consistent with a physics-based definition; specifically, velocity is speed having a particular direction. As such, the magnitude of velocity is speed. Velocity further includes a direction. When the velocity component is said to alter, that indicates that the bulk directional vector of velocity acting on an object in the fluid stream (liquid particle, solid particle, etc.) is not constant. Spiraling or helical flow-patterns are specifically defined to have substantially constant or gradually changing bulk directional velocity.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "vortex finder" refers to a centrally located pipe within a hydrocyclone for the purpose of removing overflow from the hydrocyclone. The vortex finder can be a simple pipe having an unrestricted open pipe entrance and, alternately may be provided with a flange at the pipe entrance as well, to encourage overflow to find its way from the hydrocyclone interior into the vortex finder opening.

As used herein, a plurality of components may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, volumes, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 cm to about 5 cm" should be interpreted to include not only the explicitly recited values of about 1 cm to about 5 cm, but also include individual values and sub-ranges within the indicated range. Thus, included in this numerical range are individual values such as 2, 3, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described. Consistent with this principle the term "about" further includes "exactly" unless otherwise stated.

EMBODIMENTS OF THE INVENTION

It has been found that fluids having components of different densities and/or containing different particle sizes, particularly those including particulate and liquid, can be effectively separated using a hydrocyclone having a helical confined path immediately upstream of a substantially open cylindrical vessel. Hydrocyclones of the present invention can be used as a separating mechanism for a variety of fluids. However, the hydrocyclones of the present invention can be particularly suited to de-sanding bitumen-containing aqueous fluids such as those having sand and/or gravel in a slurry of water, bitumen and solids. In another specific embodiment, the hydrocyclone can be used to de-sand bitumen-containing fluid without aerating the fluid before or during the processing to a large degree. Alternatively, in some embodiments, a small amount of air can be entrained while forming the slurry. The entrained air can attach to the bitumen and cause it to become lighter than water and thus will result in more effective transfer of bitumen to the overflow. Under some conditions, an entrained air slurry can require less water washing in the hydrocyclone and/or result in lower amounts of bitumen being lost to the underflow. However, too much air can result in a major amount of undesirable bitumen froth when the overflow is separated, e.g. by an endless cable separator as described in the concurrently application identified above or other physical separator. Further, in another embodiment, the processing of a bitumen-containing fluid through the hydrocyclone can remove about 50 to 90% of particulate in the form of gravel and sand, from the bitumen-containing fluid, although these amounts can vary depending on operating conditions and fluid properties.

In accordance with the above discussion, various embodiments and variations are provided herein which are applicable to each of the apparatus, fluid flow patterns, and methods of separating components of a fluid described herein. Thus, discussion of one specific embodiment is related to and provides support for this discussion in the context of the other related embodiments.

As a general outline, a hydrocyclone can include a substantially open cylindrical vessel with an open vessel inlet. The open vessel inlet can be configured to introduce a fluid tangentially into the open vessel. In a specific embodiment, the open vessel inlet connecting the helical confined path to the open vessel can be configured to introduce the fluid with minimal disturbance in fluid flow. The hydrocyclone can also include a helical confined path connected upstream of the open vessel at the open vessel inlet. An overflow outlet and an underflow outlet can be operatively attached to the open vessel. The underflow outlet can be attached at a location on the open vessel substantially opposite the helical confined path and open vessel inlet. The overflow outlet can terminate, on one end, at a vortex finder positioned in an interior of the open cylindrical vessel. The overflow outlet can further include a substantially enclosed conduit from the vortex finder to an exterior of the open cylindrical vessel.

Figures 1B, 1C, 2B, 2C:
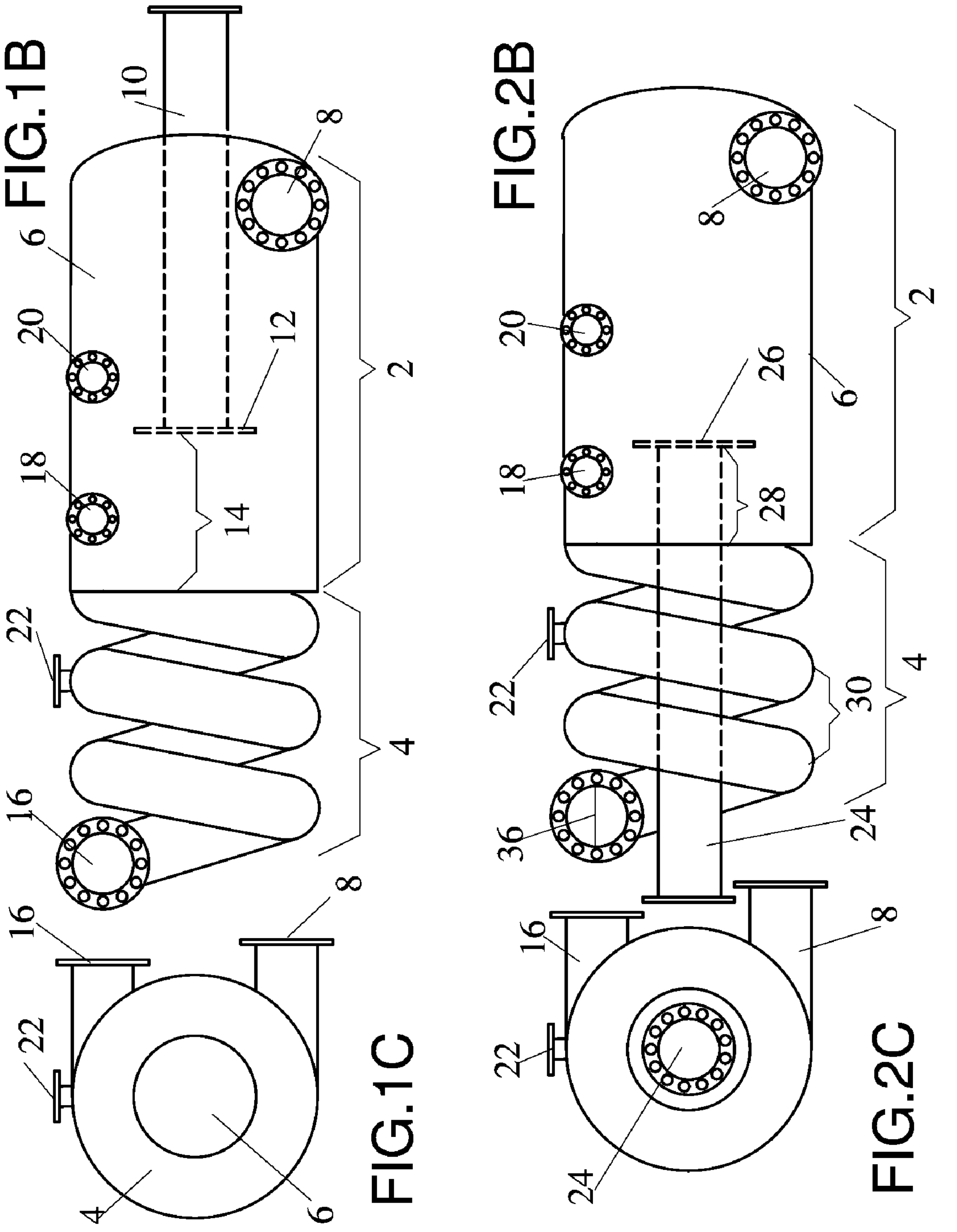
FIG. 1B is a side view of the hydrocyclone of FIG. 1A.
FIG. 1C is an end view of the hydrocyclone of FIG. 1A.
FIG. 2B is a side view of the hydrocyclone of FIG. 2A, according to one embodiment of the present invention.
FIG. 2C is an end view of the hydrocyclone of FIG. 2A.

One embodiment of a hydrocyclone 2 in accordance with the present invention is shown in FIG. 1A including a helical confined path 4 connected to a substantially open cylindrical vessel 6 at an open vessel inlet (not shown). The hydrocyclone further includes an underflow outlet 8 attached to the open vessel substantially opposite the helical confined path. The underflow outlet illustrated is oriented to match the residual helical flow within the open vessel to facilitate removal of underflow fluids. In the case of FIG. 1A, the helical confined path is on the left or on the top of the hydrocyclone, the underflow outlet is oriented on the opposite end of the open vessel on the right or on the bottom of the open vessel. The hydrocyclone further includes an overflow outlet 10 attached to the open vessel. As shown in each of FIGS. 1A and 1B, the overflow outlet 10 terminates at one end with a vortex finder 12. The vortex finder can be positioned centrally within the open vessel 6 and can be further positioned at a depth 14 that is central. As shown in FIG. 1B, such depth can be adjusted based on the particular fluid velocity, composition and other variables to maximize separation of the bitumen-rich portion (overflow) and the particulate-rich portions (underflow). FIG. 1C illustrates a top view end view of FIGS. 1A and 1B. FIG. 1C shows the underflow outlet 8 and the winding helical confined path 4. Although not always required, as can be seen in FIG. 1C, outer diameters of the helical confined path and the open vessel 6 are substantially the same, at least where these two members are joined. FIGS. 1B and 1C also illustrate the slurry inlet 16 where the fluid to be separated can be fed into the hydrocyclone. Further, the figures show optional wash inlets 18, 20 and 22 which allow injection of a rinse fluid to further enhance collection of bitumen from sand and coarse particulates. FIGS. 1A and 1B show two wash inlets 18 and 20 configured to inject wash fluid tangentially into the path of the spiraling fluid within the open vessel. Such inlets are obscured in the top view (FIG. 1C) by the slurry inlet 16. Another optional wash inlet 22 is shown in the figures and which is configured to direct fluid into the path of fluid flowing in the helical confined path. Most often, the wash water enters the helical confined path tangentially in the outer swirl region where most of the coarse solids congregate and travel as a slower moving bed than the bulk of the liquid due to centripetal action and thus wash or push bitumen containing water out of interstices between the coarse sand and particulates. Further, although inlet 22 is shown as being perpendicular to the helix, in most cases it is mounted in a tangential direction in line with and in co-direction with the helical path, similar to the mounting of inlets 18 and 20 on the open vessel. Normally several such inlets will be provided along the helical path. The velocity of the wash water must be such as to minimize disturbance of the helical flow and is thus typically lower than the average velocity of the fluid flowing in the helix, since the solids form a moving bed along the outer periphery of the helix and flow at a slower velocity than the average flow in the helix.

Figure 2A:
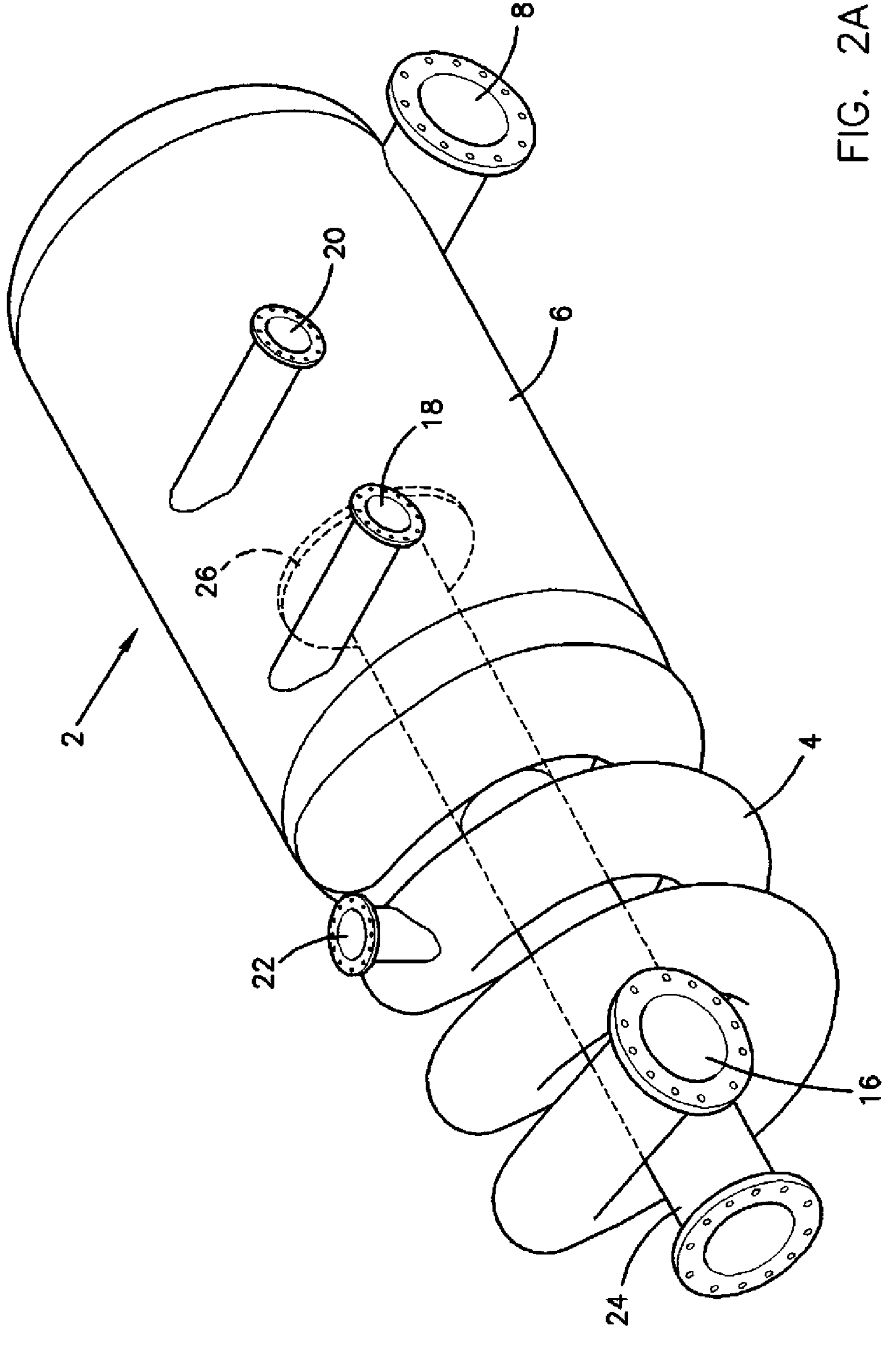
FIG. 2A is an elevated perspective view of a hydrocyclone according to another embodiment of the present invention.

FIGS. 1A through 1C are configured for co-current flow, as indicated by the overflow outlet attached in a position opposite the helical confined path and near the underflow outlet. In another alternative embodiment, FIGS. 2A through 2C illustrate a counter-current flow embodiment. In this case, the overflow outlet 24 is configured to remove overflow from a common end of the open vessel 6 as the helical confined path 4 and opposite the underflow outlet 8. As such, the vortex finder 26 is positioned a depth 28 into the open vessel 6. This depth can be again adjusted according to the particular operating conditions for a given fluid or slurry.

The helical confined path situated upstream of the open vessel can serve at least three purposes. First, it can be configured to cause a fluid to at least partially separate, or begin the separation process prior to entering the open vessel. Second, the helical confined path can cause the fluid to travel in a path that encourages further separation and easier transition once introduced into the open vessel. Third, wash water injected tangentially along the outer periphery of the helical path can replace bitumen, fines and water mixtures out of interstitial voids between coarse particulates traveling as a moving bed along the outer periphery of the helical confined path. As such, parameters such as the size and configuration of the helical path, the direction and location of wash water injection points along the helical path, the dimensions of the open vessel, and the open vessel inlet can affect processing. The number of rotations of the helical confined path can, for some fluids, allow for a shorter or longer time spent in the open vessel to produce the same level of separation. In a specific embodiment, the helical confined path can wind for about 2 to about 10 full rotations. In a further embodiment, the helical confined path can wind for about 3 to about 5 full rotations. The embodiments illustrated in FIGS. 1A through 2C show three full rotations. One rotation is indicated at 30 in FIG. 2B. In addition, the distance between successive rotations can be varied. A more extended helical spiral can result in a higher forward velocity upon entry into the open vessel. This forward velocity can be adjusted by varying the distance between successive rotations in the helical path, among other variables. As a non-limiting general guideline, the distance 30 between successive rotations can be from about 0.2 to about 4 times the outer diameter of the helical path, and in some cases from about 0.3 to about 1.5 times. The drawings show a helical path of constant curvature. However in some cases it is beneficial to configure the helical path in the form of a spiral of progressively increasing curvature until it reaches the open vessel. The spiral may be in one plane around (a compacted helical path) or near the open cylindrical vessel or assume the outline of a cone. Such a spiral provides for a gradual and progressive change in curvature and reduces the amount of disturbance as the contents flow from a pump or a straight pipe into and through the helical confined path and thence smoothly into the open cylindrical vessel.

The open vessel inlet, which introduces fluid from the helical confined path into the open cylindrical vessel, can be configured to introduce the fluid with minimal disturbance in the fluid flow. For example, the internal surfaces at the connection between the helical flow path and the open vessel can be a substantially smooth transition where the outer diameter of the helical flow path blends into the inner surface contours of the open vessel. In one embodiment, the outer diameter of the helical flow path can be substantially identical to the inner diameter of the open vessel. In the interest of simplicity, FIGS. 1B, 1C, 2B and 2C the left wall of the open vessel 6 is illustrated as being a disc instead of a domed end wall most frequently used for vessels under pressure. Regardless, the fluid exiting the helical flow path can flow in a swirl flow path within the open vessel that initially is similar to the flow path in the helical pipe. Minimal disturbance in the fluid flow from the helical path to the open vessel allows for greater separation efficiency. This configuration further reduces abrasive wear on internal surfaces of the open vessel. In particular, initiating the swirl flow well ahead of introduction into the open vessel can significantly reduce wear and abrasion of the open vessel internal walls. The slower flowing bed of solids flowing along the outer periphery of the coil will flow into the open vessel at a slower rate than non-peripheral flow of the fluid. This aspect of the present invention provides wear reduction as compared with direct tangential introduction of a slurry into an open vessel where the swirl is established only after the slurry enters the open vessel.

To aid in fluid flow, in one embodiment, a pump or a plurality of pumps can be used. This is particularly useful at the beginning of the helical confined path to cause the fluid to flow at a desired velocity which is generally relatively high. Normally a pipe or pipeline provides the slurry to the helical path but pumps can optionally be additionally used. However, care in design should be taken in order to prevent or reduce undesirable disturbance to flow patterns of the incoming slurries.

In one aspect, the helical confined path can be a pipe. Such pipe can be configured in a helix symmetrically wound at a constant curvature or at progressively increasing tight curvature. In configurations using a pipe as at least a portion of the helical confined path, the pipe can include a plurality of pipe sections. In one aspect, one or a plurality of the pipe sections can be an elbow. In embodiments that incorporate a plurality of pipe sections, including elbows, the elbows can be of any angle that allows for the pipe to be in a helical confined path. It can be useful, depending on the type and size of pipe, to incorporate readily-available pipe elbows. In one embodiment, at least one elbow can be selected from 22.5 degree, 30 degree, 45 degree, or 90 degree elbows. In one design, more than one elbow can be used together to form the desired curvature of the helical confined path. In embodiments that include a plurality of elbows, the elbows can be substantially the same angle, or can include a plurality of different angles. In a detailed embodiment, such as in FIG. 4, the elbows 32 can each have a substantially identical bend angle. FIG. 4 illustrates a helical confined path, or section of a helical confined path, that is composed of a plurality of pipe elbows. The elbows are attached at flanged joints 34. This segmented helical path can facilitate cleaning, replacement, and other maintenance.

In another embodiment, the helical confined path can be formed without pipe sections such as elbows. For example, a single length of pipe, tubing, or other confining-material can be created or formed to the desired helical shape. In the case of a pipe, such shape can be achieved by conventional pipe bending equipment or other suitable pipe shaping techniques. In the case of tubing or other readily movable material, the tubing can be wound into the desired shape and secured. These embodiments can be relatively inexpensive to make and install, but may also reduce access to internal sections for cleaning and/or maintenance.

One benefit of using a plurality of pipe sections to construct the helical confined path is that repair and replacement is relatively easy. For example, if a segment of the pipe needs replacing, it is a much simpler process to remove and replace the individual pipe section than to replace the entire pipe. Furthermore, as some maintenance of the pipe may require access to the inner channel of the pipe, it is generally simpler to detach or remove a pipe section, and thus have access to the inner area of the pipe, rather than insert tools and equipment down the length of the pipe, or to cut into a single pipe. In embodiments that include a plurality of pipe sections, the sections can be attached in any fashion that maintains that connection during normal use for the desired use time. However, care should be taken to maintain the same curvature at and near the joints as the curvature in the pipe sections in order to prevent the creation of disturbances in the flow. In a specific embodiment, at least one of the attachments can be attachment by a flanged joint. FIG. 4 shows flanged joints 34. Spacing flanged joints, as opposed to welded joints, periodically along the length of the helical confined path allows for ease of repair of the sections. Additionally, using flanged joints can allow for repair, maintenance, or treating the inner surface of the pipe. Further, relatively short flanged sections can be preferred in some embodiments, as they allow for easier repairs and/or maintenance as opposed to larger sections attached by flanged joints. Although flanged joints are discussed in conjunction to pipes, it should be noted that various optionally detachable joints can be used with a variety of materials used to create the helical confined path. When optionally detachable joints are used, the same or similar benefits can be realized as with flanged pipe joints, i.e. ease in access to inside the confined path, ease in repair, maintenance, etc.

One benefit of flanged joints, although not required, is in treating the inner surface of the helical confined path, e.g. pipe, and/or the open vessel. Some fluids can include large particulate solids, and even abrasive particulate, which can wear or otherwise alter at least part of the inner surface of the helical confined path and/or open vessel. Some fluids can affect the inner surfaces in other ways, such as corrosion and/or erosion. As such, it can be useful to provide additional wearing surfaces, particularly in the case of particulate solids in the fluid, and to reinforce such wearing surfaces to extend the working life of the surface, and thus the hydrocyclone.

Wearing surfaces can include, but are not limited to, alloy hard surfacing, ceramic coating, or the like. Flanges are not required for the instant invention but can be preferred in some embodiments, since short flanged sections of the helical confined path and/or open vessel allow repair of each section after it has been abraded for a while by coarse solids flowing through the hydrocyclone. The use of flanges also makes it more convenient to hard plate, e.g. chrome plate, the inside of these sections individually to make it more wear resistant, or to hard surface the inside of a at least a portion of each section in those areas where the inside surface is impacted by colliding solids. Hard surfacing may be done by bead welding, overlay welding, boriding, ceramic deposition, build up, cladding, or by other suitable means. Such surfacing can be uniform or patterned, e.g. herringbone, dot, bead strings, waffle, etc.

Analysis of fluid flow, taking into consideration the composition of the fluid and the shape of the hydrocyclone, can indicate the potential wearing surfaces that will experience the most wear. For processing fluids with particulate solids, the wearing surfaces of the helical confined path may include the surfaces of the confined path on the more circumferential point of the helical path. As particulate solids may, in some cases, have a greater density (or have larger particle sizes), the circumferential action on the fluid traveling through the pipe will cause the particulate solids to migrate towards the portion of the path that is furthest from a central axis of the helical path. The fluid in the open vessel experiences similar forces, and the majority of the inner surface of the open vessel, depending on flow path, can experience abrasive erosion. These areas are more likely to experience abrasive erosion than more inside sections, i.e. sections closer to the central axis of the helical path. In the cases of corrosive and/or erosive materials, the wearing surface may include a majority of the inner surface of the open vessel and/or the helical confined path. As such, in one embodiment, at least a portion of an inner surface of the open vessel and/or the helical confined path can be reinforced as a wearing surface. In a further embodiment, a majority of the inner surface of the open vessel and/or the helical confined path can be reinforced as a wearing surface.

In one embodiment, plating material onto the surface can reinforce the inner surface of open vessel and/or the helical confined path. The plated material preferably has a greater hardness than the hydrocyclone surface, or is more resistant, chemical or otherwise, to fluid action on the surface than the untreated inner surface. One of the materials used to plate the inner surface of an open vessel and/or a helical confined path can comprise or consist essentially of chrome, silicon carbide, titanium carbide or other hard materials suitable for plating or attachment to steel surfaces. Another manner of reinforcing a wearing surface can include hard surfacing the inner surface with welding tracks or beads. Other methods of reinforcing a wearing surface can include surface treatments, such as forming one or more films on the surface, and roughing or smoothing the surface. In a specific embodiment, at least a portion of an inner surface of the open vessel and/or the helical confined path includes an anti-corrosive material, for example rubber coating, urethane coating or epoxy coating.

In another embodiment, the helical confined path can be formed by wrapping a flexible hose into the shape of a coil that attaches to the open vessel inlet at the hose outlet and attaches to a pipe, pipeline or pump at the hose inlet. The hose can be made from any suitable flexible material such as, but not limited to, rubber, urethane or other durable and wear and abrasion resistant flexible material. The flexible hose can be reinforced internally in the hose walls, for example with steel mesh or steel wire. Such a hose may be relatively inexpensive to form into a helix or a spiral and will be easy to replace when worn out. The hose can be readily wrapped on a mandrel to keep it in shape or it could be fabricated to retain the form of a coil or spiral. The hose may be wrapped or fabricated to form a coil, a spiral in one plane or a spiral that assumes the outline of a cone as described previously.

The helical confined path length, much like the other parameters of the path, can vary greatly according to the composition of the fluid, desired processing, path size and confined path composition. Likewise, the diameter of the vessel can vary greatly according to the identified factors. In one aspect, the helical confined path can have a flow diameter (indicated as 16 on FIG. 2A) of less than about 10 cm. Further, the helical confined path can have a diameter of greater than about 100 cm. The open vessel can have, for example, an average diameter between the open vessel inlet and the vortex finder of less then 50 cm, although only larger open vessels are useful for most full-scale operations. In another embodiment, the open vessel can have an average diameter greater than about 1 meter, although sizes from about 200 cm to about 15 meters may be useful. In yet another embodiment, the open vessel can have an average diameter of greater than about 10 meters The diameter of each of the helical confined path and the open vessel can vary in relation to one-another. For example, in one aspect, the ratio of diameter of the open vessel to the diameter of the confined path can be about 3:1 to about 10:1. In a specific embodiment, the diameter of the open vessel to the diameter of the confined path can be about 4:1. The diameter of the helical confined path, as used herein, should not be confused with the overall diameter of the helical confined path portion of the hydrocyclone. The helical confined path has a central axis around which the helical confined path rotates. The overall diameter of the helical confined path portion of the hydrocyclone can be defined as twice the distance from the central axis to an edge, wall, or curve, of the helical confined path furthest from the central axis. In one embodiment, the overall diameter of the helical confined path portion of the hydrocyclone can be approximately the same as the diameter of the open vessel. In another embodiment, the helical confined path portion of the hydrocyclone may be a spiral with the outer diameter of the spiral being several times the diameter of the open vessel. However, these dimensions can be adjusted so as to provide either a smaller or larger helical flow path with respect to the open vessel in some embodiments, provided these do not introduce undesirable flow disturbances.

In one aspect, the open vessel can have a diameter that remains substantially uniform from the connection of the helical confined path to the depth of the vortex finder. In this case, the noted portion of the open vessel has the shape of a cylinder. In a further embodiment as shown in FIGS. 3A and 3B, the diameter of the open vessel can decrease from the depth of the vortex finder 26 to the underflow outlet 8 so as to form a conical reduction when the hydrocyclone is configured for counter-current flow of the underflow with respect to the overflow.

Another factor to consider in creating or forming a hydrocyclone is the material used to form the vessel and/or helical path walls. Standard materials can be used in the present invention. Non-limiting examples include ceramic, metal and plastic or internal covering of metal walls with ceramic, epoxy, plastic, rubber or other abrasion resistant materials. In a preferred embodiment, the hydrocyclone includes a metallic material. In a more specific embodiment, the vessel and helical confined path of the hydrocyclone can comprise or consist essentially of iron or its alloys such as steel, or steel that is coated with an abrasion resistant metal by means of plating or welding.

Processing various fluids can alter the physical properties of the fluid down the length of the helical confined path and/or the swirl path in the open vessel. In separations of this nature, in particular, it can be useful to introduce a wash fluid into the path of the fluid in an outer location, such that the wash fluid, having a lower density than at least a portion of the fluid to be separated, can travel through at least a portion of the fluid. Wash water introduced at the proper velocity tangentially into the moving solids bed of an oil sand slurry flowing along the outer periphery of the helical confined path can be made to push water containing bitumen out of the voids between particulates of the swirling stream and thereby transport bitumen to the overflow. The wash water velocity can typically be lower than the average velocity of the stream in the helical path since the solids flowing along the outer periphery of the helical path represent a moving bed of solids that flow at a lower velocity than the bulk velocity of the stream in the helix. The wash fluid traveling through the fluid to be separated thus serves to encourage further separation by freeing unseparated or trapped components.

As such, it is necessary in most cases to have one or more wash inlet operatively attached to the helical confined path. Wash inlet(s) also can be configured to introduce wash fluid into the fluid flow path within the open vessel. Likewise, the wash inlets on the helical confined path can introduce wash fluid into the path of the fluid traveling through the helical confined path. For example, the wash inlet can be in a central location in the wall of the open vessel. In one embodiment, a plurality of wash inlets can be attached tangentially to the hydrocyclone. Various configurations can be used, for example, one or a plurality of wash inlets attached to the helical confined path, with one or a plurality of wash inlets attached to the open vessel. These wash inlets can be oriented for direct injection or for tangential injection.

The inlet to the helical confined path is at one end of the helical confined path and is the primary source of introducing the fluid into the hydrocyclone. The fluid travels through the helical confined path and subsequently, the open vessel. Components of the fluid are separated and removed through the underflow outlet and the overflow outlet.

In a specific embodiment, a method for separating components from a fluid can include guiding the fluid along a helical path at a high velocity to form a helically flowing fluid. The method can further include tangentially injecting the helically flowing fluid into an open vessel such that the fluid rotates along a swirl path within the open vessel. The fluid rotation in the swirl path, and enhanced by rotation in the helical path, can be sufficient to produce an overflow and an underflow. Such fluid separation is based on the varying densities and varying particle sizes of the components of the fluid. The method can additionally include injecting a rinse fluid into at least one of the helical path and the swirl path. The overflow and underflow can be removed from the open vessel.

The fluid in the helical path can travel at any velocity sufficient to produce an initial separation of the fluid components while in the helical path and/or produce an overflow and underflow while in the open vessel. Such initial separation can include compositional differences across a diameter of flow. Although such velocity will vary depending on the design of the hydrocyclone and the fluid to be processed, in one embodiment, the magnitude of the velocity of the fluid in the helical path can be from about 1 meter per second to about 10 meters per second, and in some cases from about 2 meters per second to about 4 meters per second.

In a specific embodiment, rinse fluid can be injected into the helical path substantially prior to the tangentially injecting into the open vessel. For example, rinse fluid can be injected along the outer periphery of the helical path at a central location along the helical path between a fluid inlet to the helical path and the open vessel inlet. Such injection along the helical path can include injection of a rinse fluid at a plurality of locations along the helical path. Alternative to, or in conjunction with injecting rinse fluid into the helical path, rinse fluid of the same or different type, can be injected into the swirl path. Such injection of rinse fluid into the swirl path can be substantially subsequent to the tangentially injecting. For example, the rinse fluid can be injected at central locations to the open vessel inlet and the underflow outlet. As with injecting rinse fluid into the helical path, rinse fluid can be injected into the swirl path at a plurality of locations. In a non-limiting example, the rinse fluid can comprise or consist essentially of fresh water or recycled water containing a small amount of fine solids and bitumen.

The overflow and underflow will generally contain particulates but will have different compositions. The overflow will contain, ideally, water and bitumen and sand, silt and clay particulates which are smaller and possibly with lower density. The underflow, on the other hand, will ideally contain water, silt, sand, and particulates which are larger and possibly having a higher density. In one embodiment, the fluid to be separated can be a slurry containing particulates. In such case, and depending on the other components in the fluid, the underflow can include particulates. The hydrocyclones of the present invention are particularly suited to separation of an oil sand slurry which is a continuous water phase containing dispersed bitumen particulates or agglomerates, gravel, sand, silt and clay or a water suspension of dispersed bitumen product and fines. Alternatively, coal or other ore slurries can be effectively separated using the hydrocyclones described herein. In some alternate cases the fluid may be air or gas containing particulate or other matter which is separated by the hydrocyclone of the instant invention.

One specific use of the hydrocyclone can be in de-sanding fluids containing bitumen. In such case, the fluid can include particulates, bitumen, air and water. Particulates included in the bitumen-containing fluid can include gravel, sand, and fines. When processed, the overflow can include the majority of the bitumen of the fluid and the underflow can include the majority of the gravel and sand. In a specific embodiment, the overflow can include less than 20% of the particulates in the form of sand and fines.

Not all bitumen-containing fluids are the same, and the varying properties of the bitumen-containing fluid can be considered when designing a particular hydrocyclone. Conditions and/or design of the hydrocyclone can be specifically configured for improved and optimum processing. In a specific embodiment, the helical path and/or open vessel can be designed and shaped based on compositional and physical properties of the fluid. Therefore, parameters may be adjusted for varying types of bitumen-containing fluids.

The bitumen-containing fluid can be a result of pre-conditioning of oil sands and water. As such, the composition of the fluid can, at least partially, depend on the composition of the oil sands. Some oil sands contain a high percentage of bitumen and low percentage of fines, while other oil sands contain moderate or a small percentage of bitumen and further have a high fines content. Some oil sands come from a marine deposit and other oil sands come from a delta deposit, each having different characteristics. Some oil sands are chemically neutral by nature and other oil sands contain salts and other chemicals that affect, among other things, the pH or the salinity of the slurry.

Other factors to consider when dealing with oil sands include the composition of the rocks and gravel, and lumps of clay in the oil sand after crushing. Not only the size of the rocks, gravel and clay lumps but also the percentage of these in the crushed oil sand, as well as the shape of the rocks gravel or lumps of clay can affect processing conditions. Likewise, the chemical composition of the slurry as it is being processed by the hydrocyclone can affect processing. For example, a fluid that has a low pH or a high pH inherently, or by the addition of chemicals will have a very different rheological characteristic than a slurry that is close to neutral or close to the isoelectric point. The pH of a fluid can have a substantial impact upon the dispersion of fines in such a fluid and upon the resulting viscosity of the fluid. At high or low pH the clay fines are dispersed, resulting in low viscosity fluids in which bitumen particles and the coarse solids are substantially free to move and/or settle within the fluid.

A factor to consider in selecting processing parameters is the velocity of the fluid as it flows through the hydrocyclone, and helical confined path in particular. For a given pump capacity, a different pipe size will result in a different fluid velocity in the hydrocyclone. Therefore, multiple pumps can be used in some embodiments ahead of the helix (rather than in or after the helix which would create undesirable disturbance to the flow path).

Processing time for fluids differs greatly depending on the helical confined path, open cylindrical vessel, fluid, desired processing, etc. As a non-limiting example, however, the fluid can have an average residence time in the hydrocyclone, from introduction into the helical confined path, until removal as either underflow or overflow of from about 1 second to about 30 seconds, and in some cases from about 4 seconds to about 10 seconds.

Therefore, as outlined above, the instant invention can function to separate components of fluids. These fluids may use water, hydrocarbons, gasses or air as the conveying media. The present invention can effectively process, at least partially, fluids containing bitumen and particulate in a manner that may not require the addition of hazardous substances, or gasses to be entrained in the fluid and later removed, and the processing may not produce hazardous, toxic, or dangerous by-product streams. Additionally, the combination of a helical confined path and open vessel gives greater control over separation and fluid flow than does separation by means of one or the other portions of the hydrocyclone alone.

Of course, it is to be understood that the above-described arrangements, and specific examples and uses, are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A hydrocyclone, comprising:

a substantially open cylindrical vessel having an open vessel inlet configured to introduce a fluid tangentially into the open vessel;

a helical confined path having at least one full rotation connected upstream of the open vessel at the open vessel inlet;

an overflow outlet operatively attached to the open vessel such that the overflow outlet terminates on one end at a vortex finder positioned in an interior of the open cylindrical vessel and has a substantially enclosed conduit from the vortex finder to an exterior of the open cylindrical vessel;

an underflow outlet operatively attached to the open vessel at a location on the open vessel substantially opposite the open vessel inlet; and at least one wash inlet operatively attached to the helical confined path upstream of the open vessel, said at least one wash inlet configured to inject a wash fluid into an anticipated fluid flow path.

2. The hydrocyclone of claim 1, wherein the helical confined path is a pipe configured in a helix symmetrically wound at a constant curvature.

3. The hydrocyclone of claim 2, wherein the pipe comprises a plurality of pipe sections, wherein at least one pipe section is an elbow.

4. The hydrocyclone of claim 2, wherein at least a portion of an inner surface of the pipe or an inner surface of the open vessel is reinforced as a wearing surface.

5. The hydrocyclone of claim 2, wherein the pipe is a flexible hose.

6. The hydrocyclone of claim 1, wherein the helical confined path winds from 2 to 10 full rotations.

7. The hydrocyclone of claim 1, wherein the open cylindrical vessel has a diameter that remains substantially uniform from the connection of the helical confined path to a depth of the vortex finder.

8. The hydrocyclone of claim 7, wherein the diameter of the open cylindrical vessel decreases from approximately the depth of the vortex finder to the underflow outlet.

9. The hydrocyclone of claim 1, wherein the overflow outlet is attached to the open vessel at a location substantially opposite the underflow outlet.

10. The hydrocyclone of claim 1, wherein the overflow outlet is attached to the open vessel at a location on the open vessel substantially opposite the vessel inlet from the helical confined path, and on substantially a same end as the underflow outlet.

11. The hydrocyclone of claim 1, wherein an average diameter of the open vessel between the open vessel inlet and the vortex finder is substantially identical to an overall diameter of the helical confined path.

12. The hydrocyclone of claim 1, wherein an average diameter of the open vessel between the open vessel inlet and the vortex finder is smaller than the average diameter of the helical confined path.

13. The hydrocyclone of claim 1, wherein an average diameter of the open vessel between the open vessel inlet and the vortex finder is greater than about 1 meter.

14. The hydrocyclone of claim 1, wherein an average diameter of the open vessel between the open vessel inlet and the vortex finder is greater than about 10 meters.

15. The hydrocyclone of claim 1, wherein the open vessel inlet connecting the helical confined path to the open vessel is configured to introduce the fluid with minimal disturbance in a fluid flow.

16. A method for separating components from a fluid, comprising:

guiding the fluid along a helical path having at least one full rotation at high velocity to form a helically flowing fluid;

tangentially injecting the helically flowing fluid into an open vessel such that the fluid rotates along a swirl path within the open vessel, sufficient to produce an overflow and an underflow;

injecting a rinse fluid into the helical path upstream of the open vessel; and removing the overflow and the underflow from the open vessel.

17. The method of claim 16, wherein the rinse fluid is injected into the helical path substantially prior to the tangentially injecting into the open vessel.

18. The method of claim 17, wherein the rinse fluid is injected tangentially into the helical path at a plurality of locations at a velocity less than an average velocity of flow in the helical path.

19. The method of claim 16, wherein a rinse fluid is injected into the swirl path within the open vessel substantially subsequent to the tangentially injecting.

20. The method of claim 19, wherein the rinse fluid is injected into the swirl path at a plurality of locations.

21. The method of claim 16, wherein the rinse fluid includes water.

22. The method of claim 16, wherein the fluid is a slurry and the underflow includes particulates.

23. The method of claim 16, wherein the fluid is an oil sand slurry including bitumen, water, sand, and coarse particulates, wherein the overflow contains a bulk of the bitumen from the slurry and the underflow contains a bulk of the coarse particulates and sand of the slurry.

24. The method of claim 23, further comprising entraining air into the fluid in an amount sufficient to increase bitumen recovery in the overflow and without substantial formation of bitumen froth, said entraining air occurring prior to guiding the fluid in the helical path.

25. The method of claim 23, wherein the overflow includes less than 20% particulate as gravel or sand.

* * * * *